UNITED STATES PATENT OFFICE.

GEORG BUCHNER, OF MUNICH, ASSIGNOR TO MAX MAY, OF MINDELHEIM, GERMANY.

ARTIFICIAL STONE.

SPECIFICATION forming part of Letters Patent No. 443,250, dated December 23, 1890.

Application filed February 17, 1890. Serial No. 340,774. (No specimens.)

*To all whom it may concern:*

Be it known that I, GEORG BUCHNER, of Munich, Bavaria, Germany, have invented a new and useful Improvement in Artificial Stone, of which the following is a specification.

This invention relates to a new composition for imitating marble, granite, syenite, malachite, or similar stones.

In carrying out my invention sawdust or an equivalent body is mixed with a binding material, pressed into forms, and is then dried, polished, or planed.

The binding material I employ is composed of the following ingredients: one hundred to one hundred and fifty parts caseine; ten to twenty parts glycerine; ten to twenty parts water-glass; fifty to sixty parts mixture of hydrate of lime (100) and magnesia (10); five to ten parts oil, preferably linseed-oil.

The mixture of hydrate of lime and magnesia can be replaced by the following equivalent mixtures: mixture of barytum and magnesia, mixture of strontium and magnesia, mixture of hydrate of lime and hydrate of baryta.

The above-described binding material renders the product elastic, translucent, and water-proof. If greater elasticity is desired, more oil and glycerine are added, while for greater hardness more water-glass and magnesia are added.

The sawdust, before being mixed with the binding material, is soaked in water containing a little glycerine. In this soft form it is mixed, and then the mass is put into molds, pressed into the desired shape, and dried under 20° to 30° centigrade. It is then ready to be polished. If desired, the artificial stone when completed may be provided with a top coating of wax, cerine, or a mixture of paraffine and turpentine, to exclude the water. To this some resin may be added. Of course the sawdust may be dyed, and some coloring-matter may be mixed into the binding mass.

What I claim is—

A composition to imitate stone, and consisting of sawdust, caseine, glycerine, water-glass, hydrate of lime, magnesia, and oil, substantially as specified.

In testimony whereof I have signed this specification in the presence of two subscribing witnesses.

GEORG BUCHNER.

Witnesses:
W. CUIKMAN,
N. SEYER.